United States Patent
Jones et al.

(10) Patent No.: US 10,325,532 B2
(45) Date of Patent: *Jun. 18, 2019

(54) TASK-INDICATING SHELF

(71) Applicant: Walmart Apollo, LLC, Bentonville, AR (US)

(72) Inventors: Nicholaus Adam Jones, Fayetteville, AR (US); Matthew Allen Jones, Bentonville, AR (US); Aaron James Vasgaard, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/168,071

(22) Filed: Oct. 23, 2018

(65) Prior Publication Data

US 2019/0057628 A1    Feb. 21, 2019

Related U.S. Application Data

(63) Continuation of application No. 15/849,976, filed on Dec. 21, 2017, now Pat. No. 10,140,895.
(Continued)

(51) Int. Cl.
| | |
|---|---|
| *G08B 21/00* | (2006.01) |
| *G09F 13/22* | (2006.01) |
| *G06F 1/26* | (2006.01) |
| *G06F 1/16* | (2006.01) |
| *G06F 13/40* | (2006.01) |

(Continued)

(52) U.S. Cl.
CPC ........... *G09F 13/22* (2013.01); *A47F 5/0018* (2013.01); *A47F 5/0068* (2013.01); *A47F 11/10* (2013.01); *G06F 1/1632* (2013.01); *G06F 1/266* (2013.01); *G06F 13/4081* (2013.01); *G08B 5/36* (2013.01);
(Continued)

(58) Field of Classification Search
None
See application file for complete search history.

(56) References Cited

U.S. PATENT DOCUMENTS

| 7,155,166 B2 | 12/2006 | Swan |
| 7,270,268 B2 | 9/2007 | Garber et al. |
| (Continued) | | |

FOREIGN PATENT DOCUMENTS

| CN | 103927705 A | 7/2014 |
| CN | 102609233 B | 11/2014 |

OTHER PUBLICATIONS

U.S. Appl. No. 15/849,976, filed Dec. 21, 2017, Nicholaus Adam Jones et al.

*Primary Examiner* — Julie B Lieu
(74) *Attorney, Agent, or Firm* — McCarter & English, LLP; David R. Burns

(57) ABSTRACT

A task-indicating shelf that includes a supporting surface for supporting one or more physical objects and one or more visual indicators associated with the shelf and indicative of a task to be performed with respect to the one or more physical objects is described. The task-indicating shelf includes a docking station electrically coupled to the one or more visual indicators and configured to receive a handheld device. Docking the handheld device within the docking station powers an electric circuit between the handheld device and the one or more visual indicators to selectively energize or de-energize the one or more visual indicators.

20 Claims, 7 Drawing Sheets

Related U.S. Application Data

(60) Provisional application No. 62/444,424, filed on Jan. 10, 2017.

(51) Int. Cl.
| | | |
|---|---|---|
| *A47F 5/00* | (2006.01) | |
| *A47F 11/10* | (2006.01) | |
| *G08B 5/36* | (2006.01) | |
| G06Q 10/08 | (2012.01) | |
| A47F 10/02 | (2006.01) | |

(52) U.S. Cl.
CPC ...... *A47F 2010/025* (2013.01); *G06Q 10/087* (2013.01); *G09F 2013/222* (2013.01)

(56) References Cited

U.S. PATENT DOCUMENTS

| 7,689,316 B1 * | 3/2010 | Frederick .................. G07F 5/18 |
| --- | --- | --- |
| | | 700/232 |
| 7,766,242 B2 | 8/2010 | Lunak et al. |
| 8,380,346 B2 | 2/2013 | Chudy et al. |
| 2001/0054005 A1 | 12/2001 | Hook et al. |
| 2011/0178863 A1 | 7/2011 | Daigle |
| 2013/0211977 A1 | 8/2013 | Lyon et al. |

* cited by examiner

TASK-INDICATING SHELF

CROSS-REFERENCE TO RELATED APPLICATIONS

This is a continuation application that claims the benefit of co-pending, U.S. Non-Provisional patent application Ser. No. 15/849,976, which was filed on Dec. 21, 2017, which claims the benefit of commonly assigned U.S. Provisional Patent Application No. 62/444,424, which was filed on Jan. 10, 2017. The entire contents of the foregoing patent application are incorporated herein by reference.

BACKGROUND

A variety of products are stored and displayed on shelves for customers. Maintaining shelves in a properly stocked condition involves placing the proper product in the designated location on the shelf and ensuring that the shelf is restocked throughout the day or week for continuous display to the customer.

SUMMARY

Exemplary embodiments of the present invention provide a task-indicating shelf including one or more visual indicators (e.g., single or multicolored lights) and a docking station electrically coupled to the visual indicators. Ensuring that the product being placed on the shelf is in the correct location and/or whether restocking of a product is necessary can be a time consuming task. The exemplary task-indicating shelf allows the individual to place a handheld device (e.g., a smart electronic device) into the docking station. The handheld device powers an electric circuit between the handheld device and the visual indicators to selectively energize or de-energize the visual indicators based on tasks that need to be performed on the shelf. For example, the handheld device can energize visual indicators associated with products that require restocking, energize visual indicators associated with products that require moving to a different location, energize visual indicators associated with products that require a price change, combinations thereof, or the like. Thus, by docking the handheld device in the docking station, the visual indicators provide clear visual markers for specific tasks to be performed, simplifying the overall task of maintaining the shelf in a stocked condition.

In one embodiment, an exemplary task-indicating shelf includes a shelf, one or more visual indicators, and a docking station. The shelf includes a supporting surface for supporting one or more physical objects. The one or more visual indicators are associated with the shelf and indicative of a task to be performed with respect to the one or more physical objects. The docking station is electrically coupled to the one or more visual indicators and configured to receive a handheld device. Docking the handheld device within the docking station powers an electric circuit between the handheld device and the one or more visual indicators to selectively energize or de-energize the one or more visual indicators.

In one embodiment, an exemplary task-indicating shelf system includes a shelf and a server. The shelf includes a supporting surface, one or more visual indicators, and a docking station. The supporting surface is configured for supporting one or more physical objects thereon. The one or more visual indicators are associated with the shelf and indicative of a task to be performed with respect to the one or more physical objects. The docking station is electrically coupled to the one or more visual indicators and configured to receive a handheld device. The server is in communication (e.g., wired and/or wireless) with the handheld device. Docking the handheld device within the docking station triggers the handheld device to communicate with the server and receive a specification of tasks to be performed at the shelf from the server. Docking the handheld device within the docking station powers an electric circuit between the handheld device and the one or more visual indicators to selectively energize or de-energize the one or more visual indicators based on the task to be performed at the shelf.

In one embodiment, a method of indicating tasks to be performed on a shelf includes providing a shelf. The shelf includes a supporting surface, one or more visual indicators, and a docking station. The supporting surface is configured for supporting one or more physical objects thereon. The one or more visual indicators are associated with the shelf and indicative of a task to be performed with respect to the one or more physical objects. The docking station is electrically coupled to the one or more visual indicators and configured to receive a handheld device. The method includes docking the handheld device within the docking station of the shelf. The method includes transmitting tasks to be performed at the shelf from a server to the handheld device. The method includes powering an electric circuit from the handheld device to selectively energize or de-energize the one or more visual indicators based on the tasks to be performed at the shelf.

It should be appreciated that combinations and/or permutations of embodiments are envisioned as being within the scope of the present invention. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed task-indicating shelf, reference is made to the accompanying figures. The accompanying figures, which are incorporated in and constitute a part of this specification, illustrate one or more embodiments of the invention and, together with the description, help to explain the invention. In the figures.

DETAILED DESCRIPTION

It should be understood that certain relative terminology used herein, such as, but not necessarily limited to, "front", "rear", "left", "top", "bottom", "vertical", "horizontal", "up" and "down" is solely for the purposes of clarity and designation and is not intended to limit embodiments to a particular position and/or orientation. Accordingly, such relative terminology should not be construed to limit the scope of the present invention. In addition, it should be understood that the scope of the present invention is not limited to embodiments having specific dimensions. Thus, any dimensions provided herein are for an exemplary purpose and are not intended to limit the invention to embodiments having particular dimensions.

Exemplary embodiments of the present invention provide a task-indicating shelf including one or more visual indicators (e.g., single or multicolored lights) and a docking station electrically coupled to the visual indicators. The exemplary task-indicating shelf allows the individual to place a handheld device (e.g., a smart electronic device) into the docking station. The handheld device powers an electric circuit between the handheld device and the visual indicators to selectively energize or de-energize the visual indicators based on tasks that need to be performed on the shelf. For example, the handheld device can energize visual indicators associated with products that require restocking, energize visual indicators associated with products that require moving to a different location, energize visual indicators associated with products that require a price change, combinations thereof, or the like. Thus, by docking the handheld device in the docking station, the visual indicators provide clear visual markers for specific tasks to be performed, simplifying the overall task of maintaining the shelf in a stocked condition, reducing potential errors, and ensuring a more time efficient process.

Figure 1:
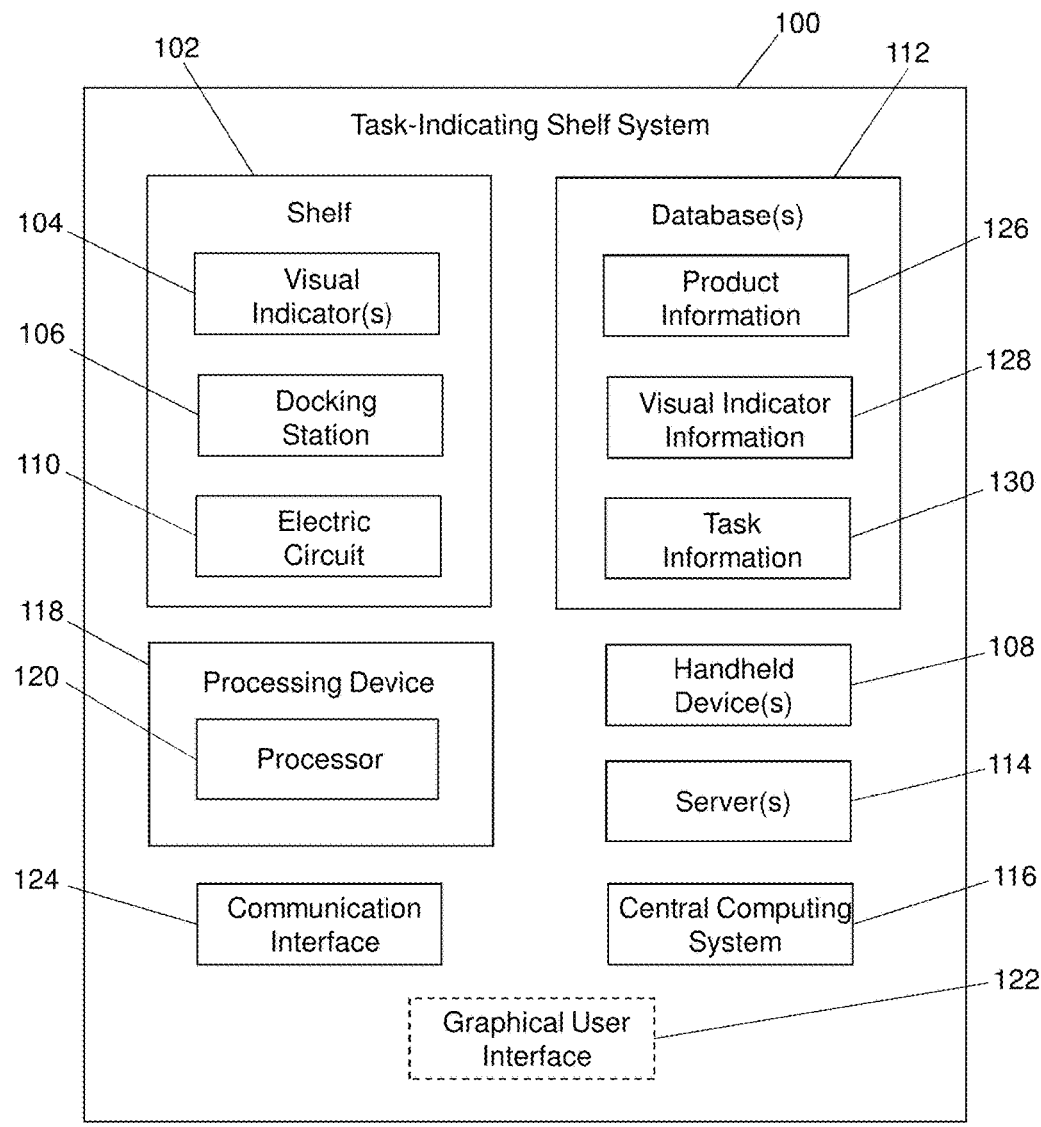
FIG. 1 is a block diagram of an exemplary task-indicating shelf system in an embodiment.

FIG. 1 is a block diagram of an exemplary task-indicating shelf system 100 (hereinafter "system 100") in accordance with exemplary embodiments. The system 100 generally includes one or more shelves 102 with a supporting surface for supporting one or more physical objects thereon. Each shelf 102 can include the supporting surface and a front surface or edge for indicating information associated with the physical object (e.g., name, price, barcode, or the like). A supporting structure can be used to support the shelf 102 and the physical objects disposed on the shelf 102.

The shelf 102 includes one or more visual indicators 104 (e.g., a light source including one or more light emitting diodes (LEDs)). The visual indicators 104 can be used to indicate a task to be performed with respect to one or more physical objects. For example, the visual indicators 104 can be used to indicate that a physical object needs to be restocked on the shelf 102, the physical object needs to be removed from the shelf 102, the price of the physical object needs to be updated, or the like. In one embodiment, the shelf 102 can include a single visual indicator 104 to designate tasks to be performed on the entire shelf 102. In one embodiment, the shelf 102 can include multiple visual indicators 104 spaced along the front face or edge of the shelf 102 (e.g., the length of the shelf 102) with each visual indicator 104 corresponding to a particular physical object or type of physical object on the shelf 102.

The shelf 102 includes one or more docking stations 106 electrically coupled to the visual indicators 106. The docking station 106 can be configured and dimensioned to at least partially receive a handheld device 108 (e.g., a smart electronic device) of an individual such as a retail associate who is to perform the tasks associated with the shelf 102. The shelf 102 includes an electric circuit 110 connecting the docking station 106 with the visual indicators 104. Docking the handheld device 108 within the docking station 106 powers the electric circuit 110 between the handheld device 108 and the visual indicators 104 to selectively energize or de-energize the visual indicators 104. In particular, the handheld device 108 can selectively energize or de-energize the visual indicators 104 based on tasks to be performed with the shelf 102.

The handheld device 108 includes a power source (e.g., a rechargeable battery). Docking the handheld device 108 within the docking station 106 and completing the electric circuit 110 allows the handheld device 108 to provide electrical power to the visual indicators 104 through the docking station 106. In one embodiment, the visual indicator 104 can be configured to be selectively energized by the handheld device 108 to emit a light having a single color. In particular, rather than implementing a separate power source incorporated into the shelf 102 for energizing the visual indicators 104, the system 100 uses the handheld device 108 as the single source of electrical power to the visual indicators 104.

In one embodiment, the visual indicator 104 can be configured to be selectively energized by the handheld device 108 to emit a flashing light of a single color. In one embodiment, the visual indicator 104 can be configured to be selectively energized by the handheld device 108 to emit lights having different colors. In one embodiment, the visual indicator 104 can be configured to be selectively energized by the handheld device 108 to emit a flashing light having different colors. In one embodiment, the visual indicator 104 can be configured to be selectively energized by the handheld device 108 to emit different light patterns.

For example, energizing a first visual indicator 104 can indicate a task of placing a specific physical object on the supporting surface of the shelf 102 at a location adjacent to or corresponding with the energized first visual indicator 104. As a further example, energizing the first visual indicator 104 could instead indicate the task of removing a physical object from the supporting surface of the shelf 102 at a location adjacent to or corresponding with the energized first visual indicator 104. In one embodiment, de-energizing the visual indicator 104 can indicate a task to be performed. For example, the handheld device 108 can energize all of the visual indicators 104 on the shelf 102 except for the visual indicator 104 corresponding with the location of physical objects that require restocking.

The system 100 includes one or more databases 112. In one embodiment, the database 112 can be electronically stored on one or more servers 114 in communication with the handheld device 108 such that updates in the database 112 are transmitted to the handheld device 108. In one embodiment, docking the handheld device 108 in the docking station 106 initiates updates from the database 112 at the handheld device 108 (e.g., a query from the handheld device 108 to the database 112) to ensure that the most up-to-date information is displayed via the visual indicators 104. In one embodiment, the system 100 can include a central computing system 116 configured to receive and/or process the data stored in the database 112. In one embodiment, the system 100 can include a processing device 118 including a processor 120 configured to process the data stored in the database 112 and/or execute one or more portions of the system 100.

In one embodiment, the system 100 can include a graphical user interface (GUI) 122 configured to, e.g., receive input of data to be stored in the database 112, provide a visual on the handheld device 108 of tasks to be performed on the shelf 102, provide a display of tasks to be performed on the shelf 102 separate from the handheld device 108, combinations thereof, or the like. The system 100 can include a communication interface 124 configured to provide wired and/or wireless communication between the handheld device 108, the database 112, the server 114, the central computing system 116, the graphical user interface 122, combinations thereof, or the like.

The database 112 can electronically store data corresponding with physical object or product information 126, visual indicator information 128, and task information 130. The product information 126 can include data relating to the name of the product, the price of the product, the aisle/bin of the product, the shelf 102 on which the product is to be placed, the number of products to be positioned on the shelf 102, or the like. The visual indicator information 128 can include data relating to the location of the visual indicators 104 (e.g., shelf, aisle/bin, or the like), the color of the visual indicator 104, the correlation between the color/pattern of light and the type of task to be completed, or the like. The task information 130 can include data relating to the task to be performed at one or more shelves 102 within a department or geographic area, such as a retail establishment. Thus, upon docking the handheld device 108 within the docking station 106, the tasks to be performed on the specific shelf 102 can be displayed to the individual via the visual indicators 104 that are energized or de-energized.

Figure 2:
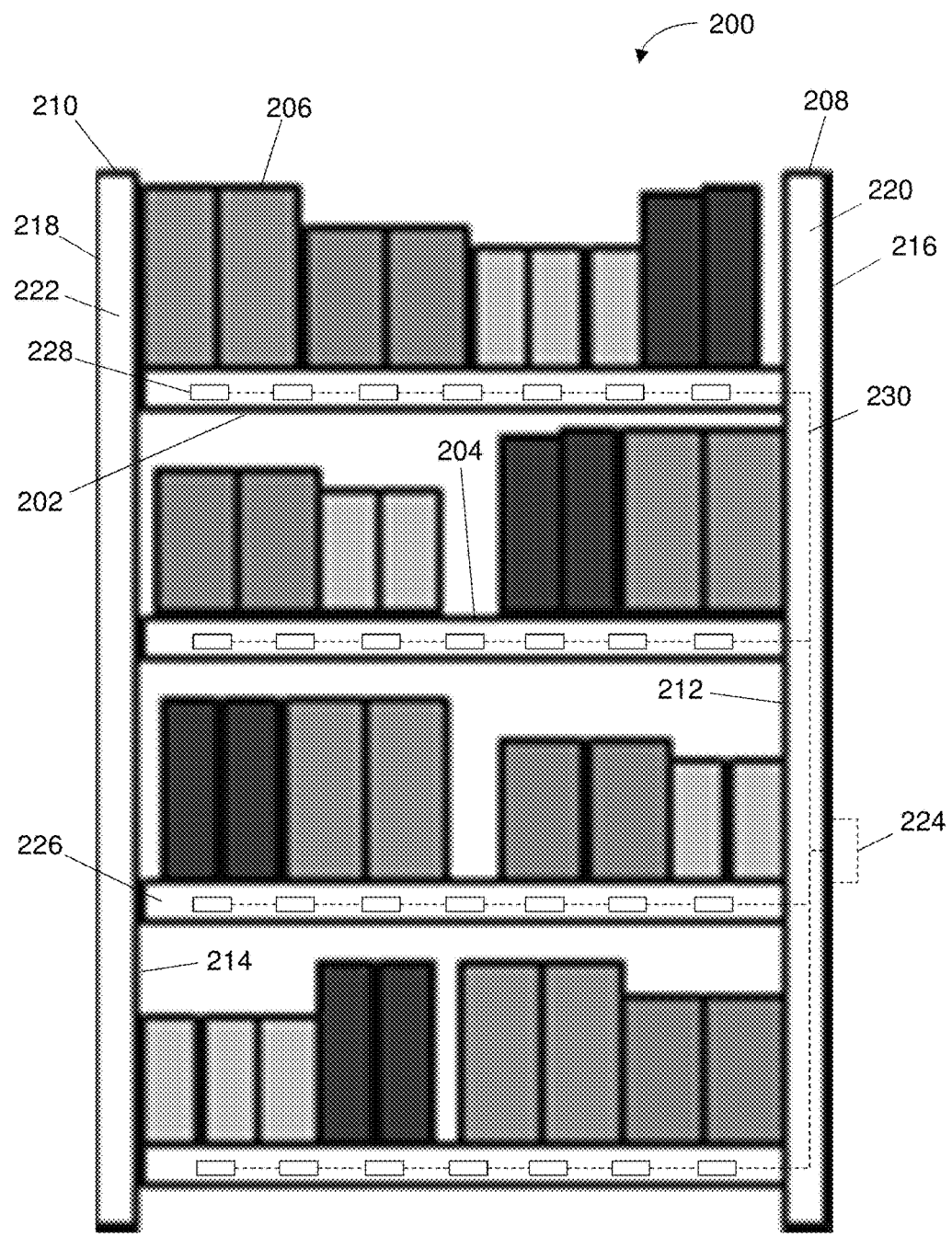
FIG. 2 is a diagrammatic front view of an exemplary task-indicating shelf structure in an embodiment.

FIG. 2 is a diagrammatic front view of an exemplary task-indicating shelf structure 200 in accordance with exemplary embodiments. The shelf structure 200 includes one or more shelves 202 each including a top or supporting surface 204 extending the length of the shelf 202. The supporting surface 204 can be configured and dimensioned to support one or more products or physical objects 206 thereon. In one embodiment, the supporting structure for maintaining the shelves 202 substantially parallel to horizontal can include vertical supports 208, 210. Each vertical support 208, 210 can include an inner side surface 212, 214, an outer side surface 216, 218, and a front surface 220, 222.

In one embodiment, the shelf structure 200 includes a docking station 224 mounted to the outer side surface 216 of the vertical support 208. In one embodiment, the docking station 224 can be mounted to one of the inner side surfaces 212, 214, one of the outer side surfaces 216, 218, one of the front surfaces 220, 222, any surface of the shelf 202, or the like. Each shelf 202 includes a front edge or surface 226 with one or more visual indicators 228.

In one embodiment, the shelf 202 can include a single visual indicator 228. In one embodiment, the shelf 202 can include multiple visual indicators 228 spaced along the front surface 226. Although illustrated as substantially rectangular, it should be understood that the visual indicators 228 can be, e.g., rectangular, square, round, oval, triangular, or any other shape. Circuitry 330 electrically couples the docking station 224 with each of the visual indicators 228 such that docking a handheld device into the docking station 224 can complete the circuit and provide power to the visual indicators 228.

In one embodiment, a single docking station 224 can be implemented for the entire shelf structure 200 and the handheld device powers the visual indicators 228 for the entire shelf structure 200 (e.g., multiple shelves 202). In one embodiment, each shelf 202 can include a separate docking station 224, the handheld device can be docked in the docking station 224 specific to the shelf 202, and the handheld device powers only those visual indicators 228 associated with the specific shelf 202.

Figure 3:
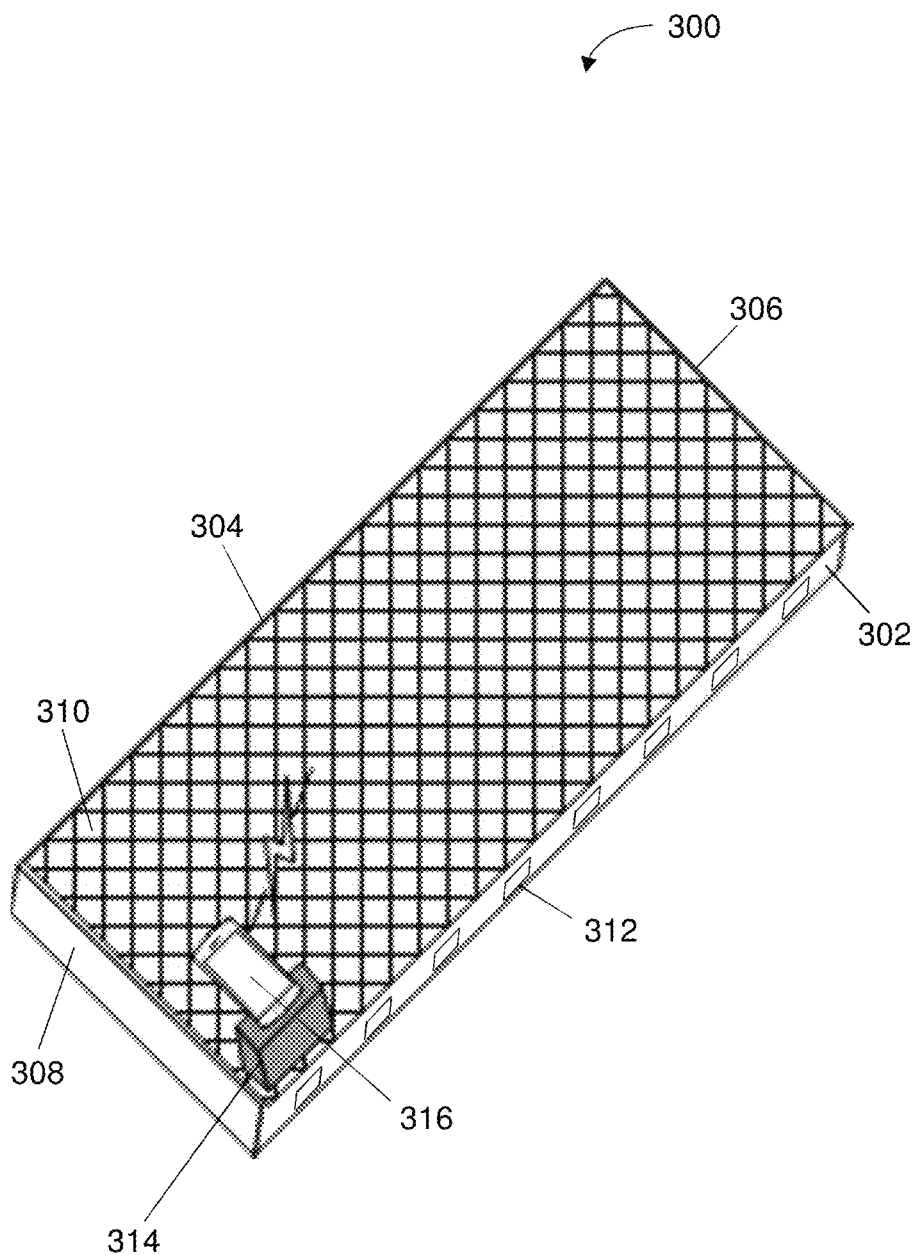
FIG. 3 is a diagrammatic perspective view of an exemplary task-indicating shelf in an embodiment.

FIG. 3 is a diagrammatic perspective view of an exemplary task-indicating shelf 300 in accordance with exemplary embodiments. The shelf 300 includes a front surface 302, a rear surface 304, and side surfaces 306, 308. Within the perimeter of the front, rear and side surfaces 302-308, the shelf 300 includes a top or supporting surface 310 configured to receive one or more physical objects thereon. The front surface 302 includes a plurality of visual indicators 312 spaced from each other to distinguish between the different physical objects positioned on the shelf 300. In one embodiment, the visual indicators 312 can be positioned on the supporting surface 310 of the shelf 300, or can extend from the supporting surface 310 to the front surface 302.

The shelf 300 of FIG. 3 includes a docking station 314 mounted to the supporting surface 310 at an edge adjacent to the front and side surfaces 302, 308. It will be appreciated that in other embodiments, the docking station 314 can be mounted at any point of the supporting surface 310, the front surface 302, or the side surfaces 306, 308. A handheld device 316 can be docked within the docking station 314 to provide electrical power to the visual indicators 312. The handheld device 316 can communicate with a central server to determine the tasks to be performed on the shelf 300, and energizes or de-energizes the visual indicators 312 to provide an indication that specific tasks should be completed.

Figure 4:
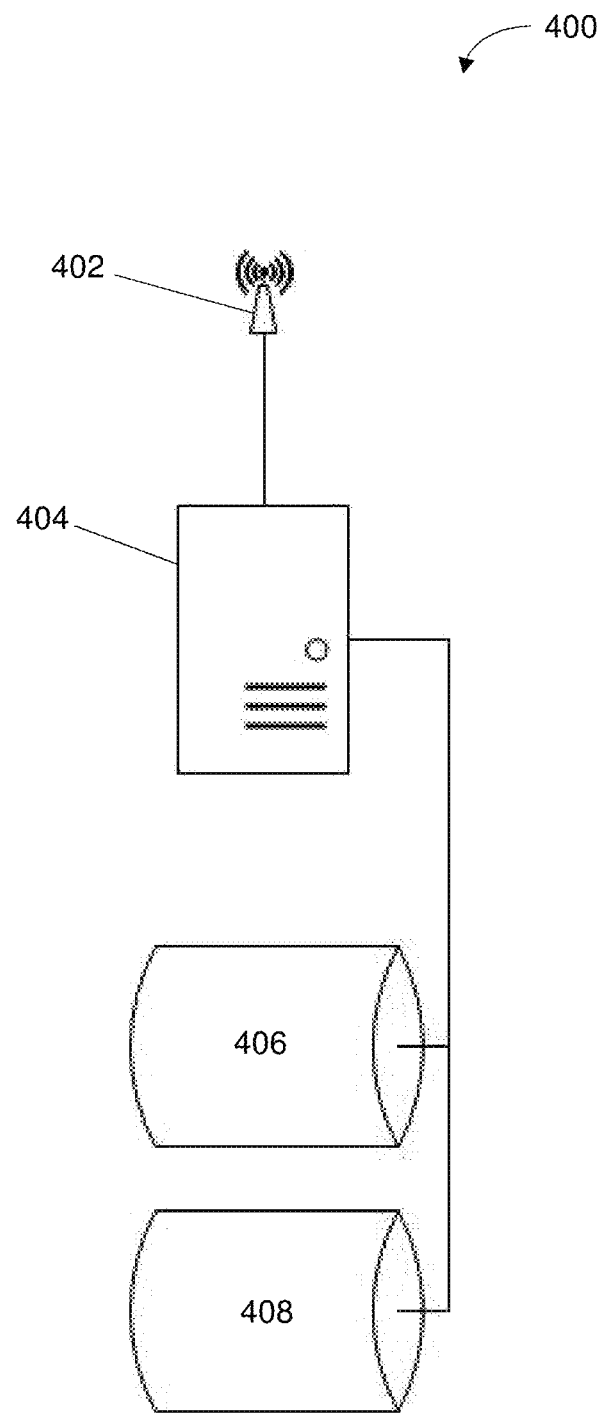
FIG. 4 is a block diagram of an exemplary storage system in an embodiment.

FIG. 4 is a block diagram of an exemplary storage system 400 in accordance with exemplary embodiments. The storage system 400 includes one or more databases 406, 408 configured to electronically store information corresponding with the products or physical objects, the visual indicators, the tasks to be performed, combinations thereof, or the like. The databases 406, 408 can be electronically coupled with one or more servers 404 which, in turn, can be electronically coupled with an access point 402. The access point 402 can be in communication with one or more handheld devices such that the data stored in the databases 406, 408 can be electronically transmitted to the handheld devices. The access point 402 can be in communication with a central computing system such that the date stored in the databases 406, 408 can be updated (e.g., in substantially real-time).

Figure 5:
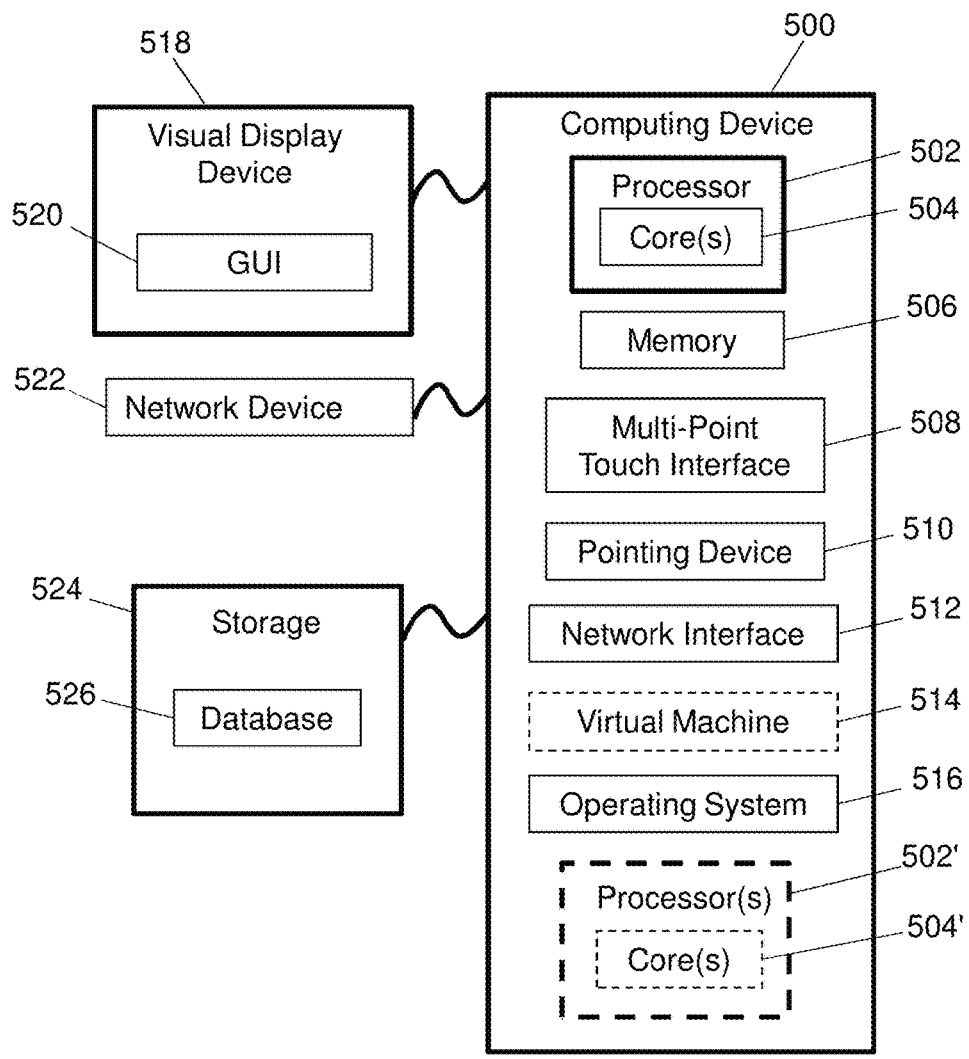
FIG. 5 is a block diagram of a computing device in an embodiment.

FIG. 5 is a block diagram of a computing device 500 in accordance with exemplary embodiments. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 506 included in the computing device 500 may store computer-readable and computer-executable instructions or software for implementing exemplary embodiments of the present disclosure (e.g., instructions for controlling the docking station 106, instructions for controlling the handheld device 108, instructions for controlling the server 114, instructions for controlling the central computing system 116, instructions for controlling the communication interface 124, instructions for controlling the processing device 118, combinations thereof, or the like). The computing device 500 also includes configurable and/or programmable processor 502 and associated core 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' may each be a single core processor or multiple core (504 and 504') processor.

Virtualization may be employed in the computing device 500 so that infrastructure and resources in the computing device 500 may be shared dynamically. A virtual machine 514 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof.

A user may interact with the computing device 500 through a visual display device 518 (e.g., a personal computer, a mobile smart device, or the like), such as a computer monitor, which may display one or more user interfaces 520 (e.g., GUI 122) that may be provided in accordance with exemplary embodiments. The computing device 500 may include other I/O devices for receiving input from a user, for example, a keyboard or any suitable multi-point touch interface 508, a pointing device 510 (e.g., a mouse). The keyboard 508 and the pointing device 510 may be coupled to the visual display device 518. The computing device 500 may include other suitable conventional I/O peripherals.

The computing device 500 may also include one or more storage devices 524, such as a hard-drive, CD-ROM, or other computer readable media, for storing data and computer-readable instructions and/or software that implement one or more portions of the system 100. Exemplary storage device 524 may also store one or more databases 526 for storing any suitable information required to implement exemplary embodiments. For example, exemplary storage device 524 can store one or more databases 526 for storing information, such as data relating to the product information 126, visual indicator information 128, task information 130, or the like, and computer-readable instructions and/or software that implement exemplary embodiments described herein. The databases 526 may be updated by manually or automatically at any suitable time to add, delete, and/or update one or more items in the databases.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 may include a built-in network adapter, network interface card, PCMCIA network card, card bus network adapter, wireless network adapter, USB network adapter, modem or any other device suitable for interfacing the computing device 500 to any type of network capable of communication and performing the operations described herein. Moreover, the computing device 500 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 500 may run an operating system 516, such as versions of the Microsoft® Windows® operating systems, the different releases of the Unix and Linux operating systems, versions of the MacOS® for Macintosh computers, embedded operating systems, real-time operating systems, open source operating systems, proprietary operating systems, or other operating systems capable of running on the computing device and performing the operations described herein. In exemplary embodiments, the operating system 516 may be run in native mode or emulated mode. In an exemplary embodiment, the operating system 516 may be run on one or more cloud machine instances.

Figure 6:
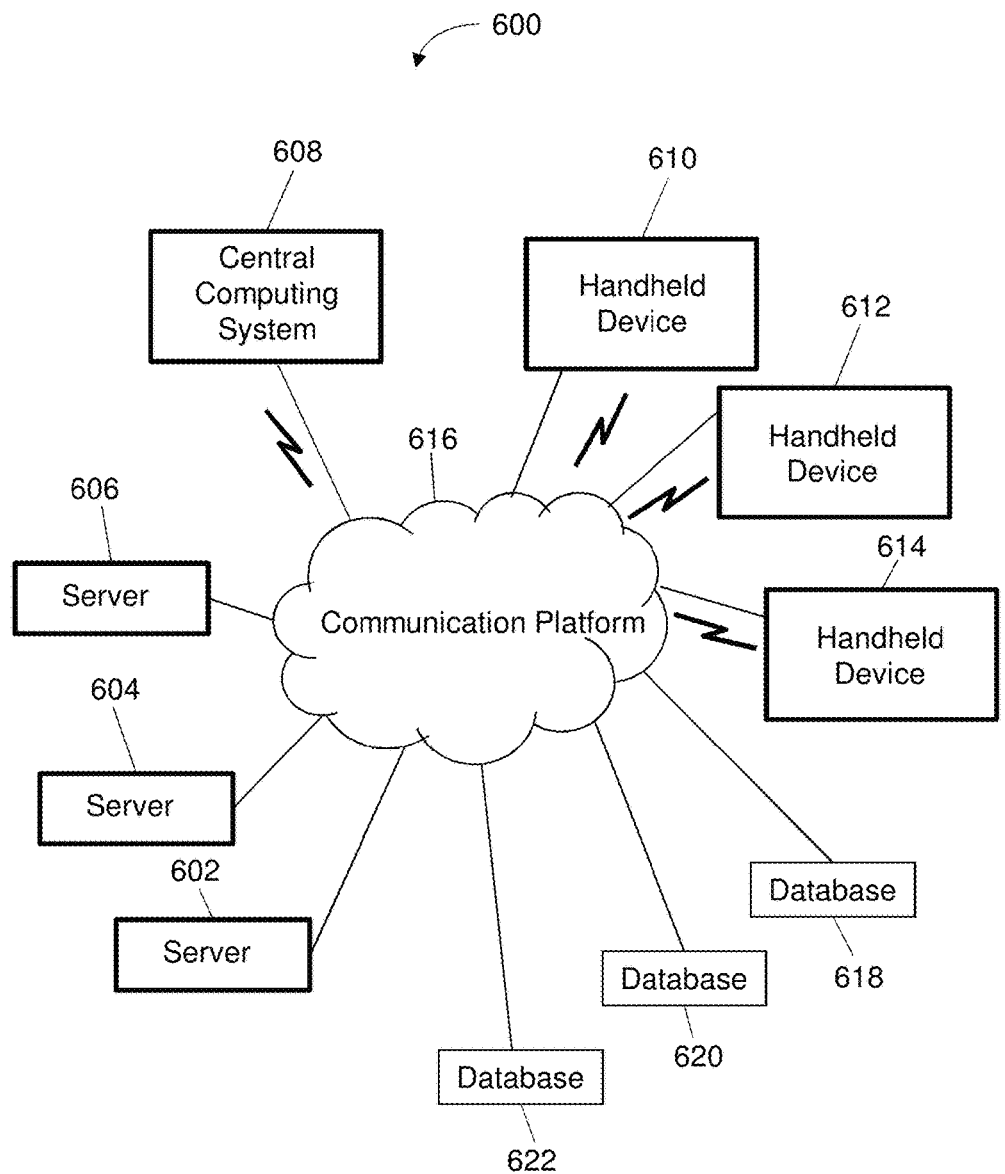
FIG. 6 is a block diagram of a task-indicating shelf environment in an embodiment.

FIG. 6 is a block diagram of an exemplary task-indicating shelf system environment 600 in accordance with exemplary embodiments of the present disclosure. The environment 600 can include servers 602, 604, 606 operatively coupled to a central computing system 608, and one or more handheld devices 610, 612, 614, via a communication platform 616, which can be any network over which information can be transmitted between devices communicatively coupled to the network. For example, the communication platform 616 can be the Internet, Intranet, virtual private network (VPN), wide area network (WAN), local area network (LAN), and the like. In an embodiment, the communication platform 616 can be part of a cloud environment. The environment 600 can include repositories or databases 618, 620, 622, which can be operatively coupled to the servers 602, 604, 606, as well as to the central computing system 608, and handheld devices 610, 612, 614, via the communications platform 616.

In exemplary embodiments, the servers 602, 604, 606, central computing system 608, handheld devices 610, 612, 614, and databases 618, 620, 622 can be implemented as computing devices (e.g., computing device 500). Those skilled in the art will recognize that the databases 618, 620, 622 can be incorporated into one or more of the servers 602, 604, 606 such that one or more of the servers 602, 604, 606 can include databases 618, 620, 622. In an embodiment, the database 618 can store the product information 126, the database 620 can store the visual indicator information 128, and the database 622 can store the task information 130. In an embodiment, a single database 618, 620, 622 can store the product information 126, visual indicator information 128, and task information 130.

In an embodiment, embodiments of the servers 602, 604, 606 can be configured to implement one or more portions of the system 100. For example, server 602 can be configured to implement one or more portions of the central computing system 116. As a further example, server 604 can be configured to implement one or more portions of the communication interface 124. In an embodiment, rather than referencing the servers 602, 604, 606 and/or the central computing system 116, the handheld devices 610, 612, 614 can include all of the data necessary for operating the system 100. For example, the handheld device 610 can include the product information 126, visual indicator information 128, and task information 130.

Figure 7:
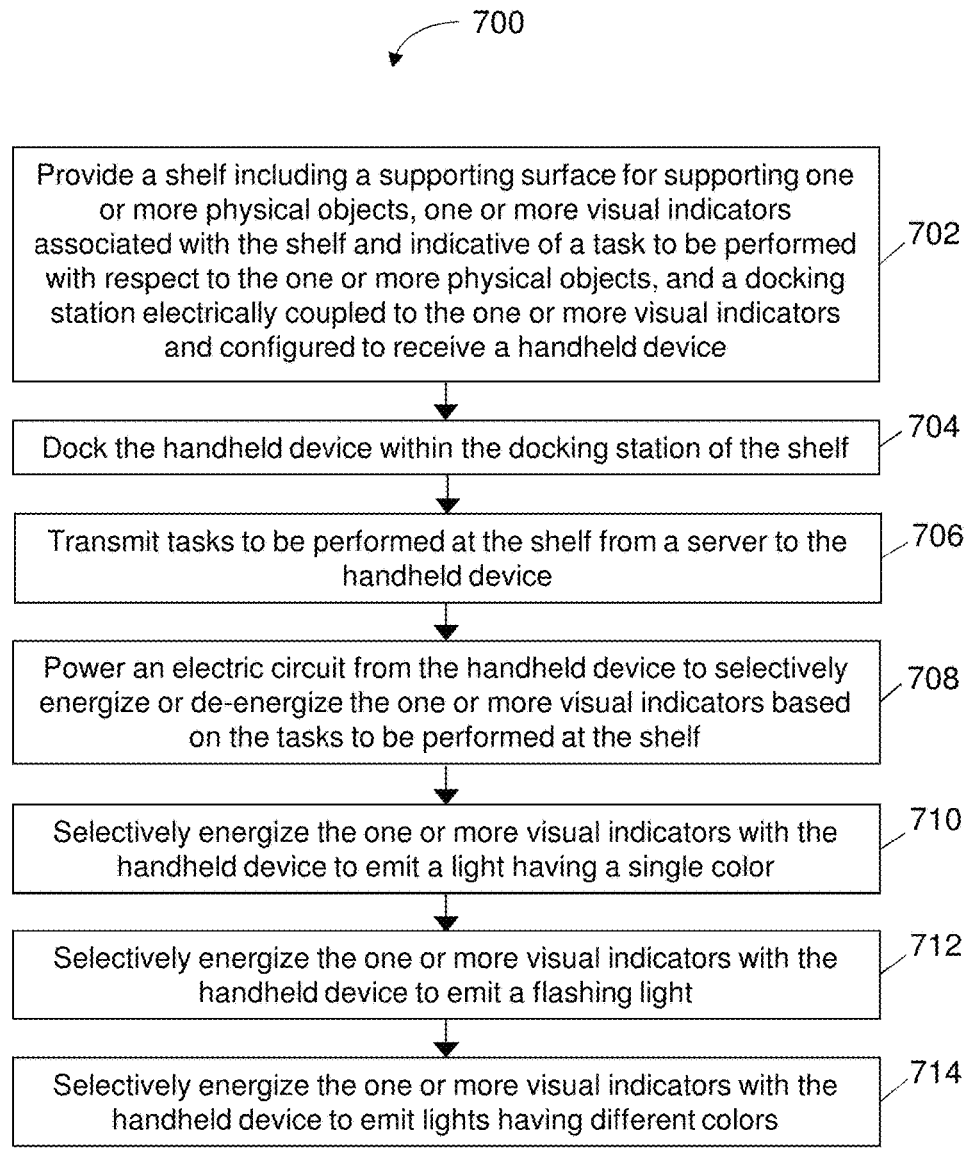
FIG. 7 is a flowchart illustrating an implementation of a task-indicating shelf system in an embodiment.

FIG. 7 is a flowchart illustrating an exemplary process 700 as implemented by the task-indicating shelf system 100. To begin, at step 702, a task-indicating shelf is provided and includes a supporting surface for supporting one or more physical objects, one or more visual indicators associated with the shelf and indicative of a task to be performed with respect to the one or more physical objects, and a docking station electrically coupled to the one or more visual indicators and configured to receive a handheld device. At step 704, the handheld device is docked within the docking station of the shelf. At step 706, tasks to be performed at the shelf are electronically transmitted from a server to the handheld device.

At step 708, an electric circuit is powered from the handheld device to selectively energize or de-energize the one or more visual indicators based on the task to be performed at the shelf. In one embodiment, at step 710, one or more visual indicators can be selectively energized with the handheld device to emit a light having a single color. In one embodiment, at step 712, one or more visual indicators can be selectively energized with the handheld device to emit a flashing light. In one embodiment, at step 714, one or more visual indicators can be selectively energized with the handheld device to emit lights having different colors and/or lighting patterns.

Thus, the exemplary task-indicating shelf provides visual markers associated with tasks to be performed with specific physical objects of the shelf. Rather than having an external power source, the docking station receives the handheld device and the handheld device powers the appropriate visual indicators. Particularly, the handheld device powers an electric circuit between the handheld device and the visual indicators to selectively energize or de-energize the visual indicators based on tasks that need to be performed on the shelf. Thus, by docking the handheld device in the docking station, the visual indicators provide clear visual markers for specific tasks to be performed, simplifying the overall task of maintaining the shelf in a stocked condition.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A task-indicating shelf, comprising:
   a shelf including a supporting surface for supporting one or more physical objects;
   one or more visual indicators associated with the shelf and indicative of a task to be performed with respect to the one or more physical objects, each of the one or more visual indicators corresponding to a particular type of physical object on the shelf; and
   a docking station electrically coupled to the one or more visual indicators and configured to receive a handheld device;
   wherein docking the handheld device within the docking station powers an electric circuit between the handheld device and the one or more visual indicators to selectively energize or de-energize the one or more visual indicators.

2. The task-indicating shelf of claim 1, wherein the handheld device provides electrical power to the one or more visual indicators through the docking station.

3. The task-indicating shelf of claim 1, wherein the one or more visual indicators are spaced along a length of the shelf.

4. The task-indicating shelf of claim 1, wherein the one or more visual indicators are disposed along a front face of the shelf.

5. The task-indicating shelf of claim 1, wherein at least one of the one or more visual indicators is a light source including a light emitting diode.

6. The task-indicating shelf of claim 1, wherein at least one of the one or more visual indicators is configured to be selectively energized by the handheld device to emit a light having a single color.

7. The task-indicating shelf of claim 1, wherein at least one of the one or more visual indicators is configured to be selectively energized by the handheld device to emit a flashing light.

8. The task-indicating shelf of claim 1, wherein at least one of the one or more visual indicators is configured to be selectively energized by the handheld device to emit lights having different colors.

9. The task-indicating shelf of claim 1, wherein energizing a first visual indicator of the one or more visual indicators indicates a task of placing a physical object on the supporting surface of the shelf at a location adjacent to the energized first visual indicator.

10. The task-indicating shelf of claim 1, wherein energizing a first visual indicator of the one or more visual indicators indicates a task of removing a physical object from the supporting surface of the shelf at a location adjacent to the energized first visual indicator.

11. A task-indicating shelf system, comprising:
    a shelf including:
      a supporting surface for supporting one or more physical objects;
      one or more visual indicators associated with the shelf and indicative of a task to be performed with respect to the one or more physical objects, each of the one or more visual indicators corresponding to a particular type of physical object on the shelf; and
      a docking station electrically coupled to the one or more visual indicators and configured to receive a handheld device; and
    a server in communication with the handheld device;
    wherein docking the handheld device within the docking station triggers the handheld device to communicate with the server and receive a specification of tasks to be performed at the shelf from the server; and
    wherein docking the handheld device within the docking station powers an electric circuit between the handheld device and the one or more visual indicators to selectively energize or de-energize the one or more visual indicators based on the task to be performed at the shelf.

12. The task-indicating shelf system of claim 11, wherein the handheld device provides electrical power to the one or more visual indicators through the docking station.

13. The task-indicating shelf system of claim 11, wherein at least one of the one or more visual indicators is a light source including a light emitting diode.

14. The task-indicating shelf system of claim 11, wherein at least one of the one or more visual indicators is configured to be selectively energized by the handheld device to emit a light having a single color.

15. The task-indicating shelf system of claim 11, wherein at least one of the one or more visual indicators is configured to be selectively energized by the handheld device to emit a flashing light.

16. The task-indicating shelf system of claim 11, wherein at least one of the one or more visual indicators is configured to be selectively energized by the handheld device to emit lights having different colors.

17. The task-indicating shelf system of claim 11, wherein energizing a first visual indicator of the one or more visual indicators indicates a task of placing a physical object on the supporting surface of the shelf at a location adjacent to the energized first visual indicator.

18. The task-indicating shelf system of claim 11, wherein energizing a first visual indicator of the one or more visual indicators indicates a task of removing a physical objects from the supporting surface of the shelf at a location adjacent to the energized first visual indicator.

19. A method of indicating tasks to be performed on a shelf, comprising:
   providing a shelf including:
      a supporting surface for supporting one or more physical objects;
      one or more visual indicators associated with the shelf and indicative of a task to be performed with respect to the one or more physical objects, each of the one or more visual indicators corresponding to a particular type of physical object on the shelf; and
      a docking station electrically coupled to the one or more visual indicators and configured to receive a handheld device;
   docking the handheld device within the docking station of the shelf;
   transmitting tasks to be performed at the shelf from a server to the handheld device; and
   powering an electric circuit from the handheld device to selectively energize or de-energize the one or more visual indicators based on the tasks to be performed at the shelf.

20. The method of claim 19, further comprising:
   selectively energizing the one or more visual indicators with the handheld device to emit a light having a single color.

* * * * *